United States Patent
Chou (10) Patent No.: US 7,796,120 B2
(45) Date of Patent: Sep. 14, 2010

(54) METHOD AND APPARATUS FOR DETECTING IMAGE MOVEMENT

(75) Inventor: Tse-An Chou, Taichung (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 1030 days.

(21) Appl. No.: 11/198,755

(22) Filed: Aug. 4, 2005

(65) Prior Publication Data

US 2006/0139458 A1 Jun. 29, 2006

(30) Foreign Application Priority Data

Dec. 27, 2004 (TW) .............................. 93140723 A (51) Int. Cl.
*G06F 3/033* (2006.01)

(52) U.S. Cl. .................................... 345/166

(58) Field of Classification Search ......... 345/156–158, 345/163–167, 175, 856; 250/221, 222.1, 250/559.22
See application file for complete search history.

(56) References Cited

U.S. PATENT DOCUMENTS

| | | | |
|---|---|---|---|
| 5,729,008 A | 3/1998 | Blalock et al. ........... 250/208.1 |
| 6,664,948 B2* | 12/2003 | Crane et al. .................. 345/166 |
| 6,750,846 B2* | 6/2004 | Rotzoll ........................ 345/166 |
| 6,995,748 B2* | 2/2006 | Gordon et al. ............... 345/166 |
| 7,057,148 B2* | 6/2006 | Wang .......................... 345/166 |
| 7,161,586 B2* | 1/2007 | Lauffenburger et al. ..... 345/175 |
| 7,176,442 B2* | 2/2007 | Feldmeier et al. ........... 345/163 |
| 2002/0185617 A1* | 12/2002 | Oliver et al. ........... 250/559.22 |
| 2003/0081129 A1 | 5/2003 | Lin et al. .................. 348/208.6 |
| 2003/0193529 A1* | 10/2003 | Lee et al. ..................... 345/856 |
| 2004/0130532 A1* | 7/2004 | Gordon et al. ............... 345/166 |
| 2005/0190158 A1* | 9/2005 | Casebolt et al. ............. 345/166 |

* cited by examiner

*Primary Examiner*—Chanh Nguyen
*Assistant Examiner*—Adam J Snyder
(74) *Attorney, Agent, or Firm*—J.C. Patents (57) ABSTRACT

A method of detecting image movement is provided. A reference frame is accessed, and a reference window is captured from the reference frame. A sampling frame is then accessed. When the reference window has not reached the margin of the reference frame, a new window is captured from the reference frame to replace the reference window. From the reference frame, a window matching the reference window is searched and a moving vector is calculated. When the sampling window reaches the margin of the sampling frame, the sampling frame replaces the reference frame. Another reference window is also captured from the reference frame, and the step of accessing the sampling frame is repeated.

14 Claims, 7 Drawing Sheets

METHOD AND APPARATUS FOR DETECTING IMAGE MOVEMENT

CROSS-REFERENCE TO RELATED APPLICATION

This application claims the priority benefit of Taiwan application serial no. 93140723, filed on Dec. 27, 2004. All disclosure of the Taiwan application is incorporated herein by reference.

BACKGROUND OF THE INVENTION

1. Field of the Invention

The present invention relates to a method and an apparatus for detecting image movement, and more particularly to a method and an apparatus for detecting image movement capable of enhancing displacement and small angle detection.

2. Description of the Related Art

With the advance of computer functions, and development in internet and multi-media technology, image data are transmitted in the digital form, rather than in analog form. In order to meet the modern life style, peripheral apparatus of computers have developed to be slim, precisely controllable, and multi-functional. For example, a conventional mouse uses a ball to control the locations. Though the structure is simple, a mouse must be frequently cleaned to get rid of the accumulated dust, and also the low location resolution is another disadvantage. The recently introduced optical mouse can resolve this issue and precisely control the location and reduce errors.

The traditional optical mouse uses the block match method to determine the displacement of the frame detector. By comparing the acquired sampling window and the reference window based on the mean-squared error method, or a mean absolute difference (MAD) method, the displacement of the frame detector can be obtained.

Figure 1:
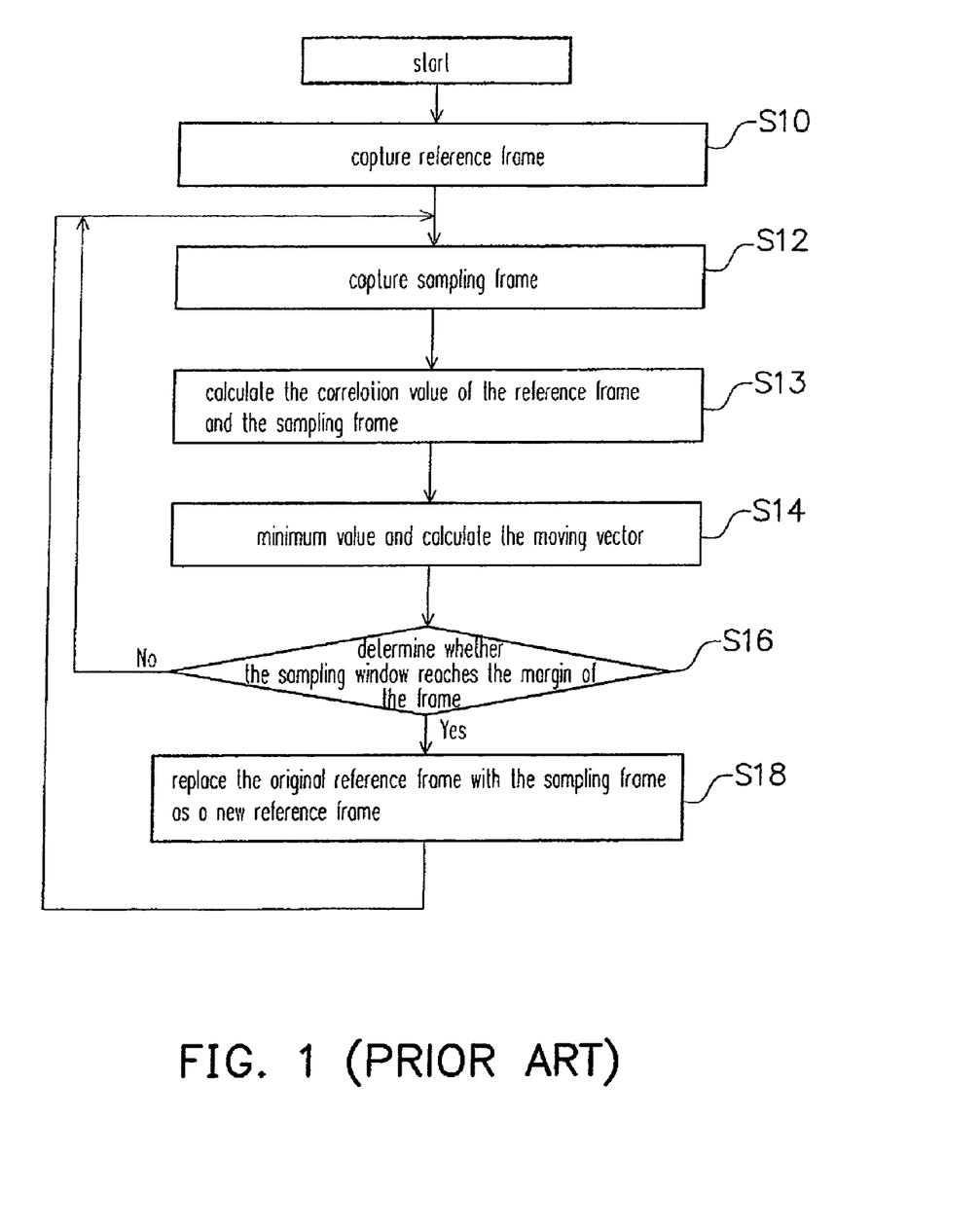
FIG. 1 is a flowchart showing a conventional block match method to determine displacement of a frame detector.

FIG. 1 is a flowchart showing a conventional block match method to determine the displacement of a frame detector. Referring to FIG. 1, the frame detector first captures a reference frame at the first location in the step S10. In the step S112, the detector moves to a second location to capture another sampling frame. If both the reference frame and the sampling frame are 6×6, then a smaller 2×2 reference window is captured from the reference frame, and the frame is divided into 9 non-overlapping frame windows. Then, a window having the same gray level as that of the frame window in the sampling frame is sequentially sought according to the block match method. The relative functions of the frame window and the sampling frame are calculated in the step S13. In the step S14, the displacement and the moving vector between the windows having the smallest functions are calculated. In the step S16, it is determined whether the frame window has reached the margin of the frame. If the frame window has reached the margin of the frame, the original reference frame is replaced by the sampling frame as a new reference frame in the step S18. In fact, the frame detector has several noise sources. In addition to the variation of the semiconductor process, the noises from the power, and the signal noises, the frame detector is also affected by temperature and brightness of the outside environment. Accordingly, only the window having the gray level most similar to that of the previous frame can be found. Detecting errors are unavoidable.

In the traditional technology, due to the restrictions of the frame detector size and the frame speed, the moving speed of the frame detector is limited. If the frame captured by the frame detector is M×M, and the frame window is N×N, the pixel dimension of the frame detector is PN×PN, and the frame speed is FN frame/sec. In the example that the frame window is located at the center of the acquired frame array, the displacement ranges allowed in the horizontal and the vertical directions are ±(M−N)/2, and the maximum moving speeds allowed in the in the horizontal and the vertical directions are PN×[±(M−N)/2]×FN. When the moving speed of the frame detector is higher than the limit allowed for the hardware, the window having a gray level similar to that of the frame window cannot be captured by the block match method. This will result in incorrect determination in the block match method, and the displacement of the frame detector cannot be correctly calculated.

Accordingly, a method for detecting displacement of a frame detector is provided in the US Patent Application Publication 2003/0081129, entitled "METHOD FOR DETECTING MOVEMENT OF IMAGE SENSORS", filed by Lin et al. In this patent publication, the frame detector captures a specific part of the reference frame at the first location. The frame detector then moves to the second location to capture a sampling frame. By comparing the reference frame and the sampling frame, the frame with the same specific part of the reference frame is obtained, and the displacement of the frame detector is determined. Based on the moving direction of the detector, the location of a new reference frame captured by the frame detector at the third location is determined so as to calculate the displacement of the frame detector. This patent dynamically adjusts the location of the reference window of the next reference frame to enhance the maximum displacement. Though increasing the maximum displacement, this method cannot enhance the moving angle detection.

The U.S. Pat. No. 5,729,008 provides a method of detecting frame displacement. This method uses a quadric to form the correlation surface model, and the point of the minimum value to calculate the integer part of the displacement. Based on the correlation value of the point and the surrounding points, the minor displacement in decimal is calculated by the interpolation method. When the correlation value is calculated, the difference at each point must be measured, and hardware is required to calculate the displacement in decimal. As a result, a complex and great calculation is unavoidable.

Accordingly, for keeping the hardware structure simple and reducing the calculation, the conventional method to detect the image movement still leaves room for improvement.

SUMMARY OF THE INVENTION

Accordingly, the present invention is directed to a method of detecting image movement. In the same reference frame, different reference windows can be dynamically captured in the direction reverse to the direction of the moving vector based on the previously detected frame. Accordingly, the detecting capability of single-direction maximum displacement can be enhanced. In addition, the capability of detecting minor displacement in various directions can also be improved so that the minor angle variation of the frame can be detected. When the detected frame displacement is larger than the maximum detectable displacement, the moving vector is compensated according to the principle of inertia.

The present invention is also directed to an apparatus for detecting image movement. For keeping the hardware structure simple and reducing the calculation, the present invention enhances the capabilities of detecting the maximum displacement and the minor displacement. Accordingly, the sensitivity of detecting the frame angle variation doubles that of the conventional technology.

In an embodiment of the present invention, the steps of detecting the image movement are described below. First, a first frame is captured as the reference frame, and a second frame serves as a first sampling frame. The center of the reference frame is a reference window. The windows in the sampling frame are sampled. According to the relative locations of the reference frame and the sampling windows, the moving speed and the moving vector are calculated. When the detected image movement displacement is higher than the maximum detectable displacement, the moving vector is compensated according to the principle of inertia. Then, the present invention determines whether both the reference window and the sampling window have reached the margin of the frame. If not, a new window is captured in the reverse direction of the moving vector based on the moving speed and the moving vector. If so, the reference frame is renewed. Then, the steps described above are repeated until the reference window and the sampling window have reached the margin of the frame. The sampling frame in which the sampling window has reached the margin of the frame would replace the original reference frame to become a new reference frame. According to the new reference frame, a new reference window is captured and the steps described above are repeated.

Before the sampling window reaches the margin of the frame, in the same reference frame, different reference windows are dynamically captured in the reverse direction of the image movement vector according to the previously detected frame. Accordingly, the capability of detecting the maximum displacement is enhanced. In addition, the reference frame is not renewed until both the reference window and the sampling window have reached the margin of the frame. Accordingly, the capability of detecting minor displacement in horizontal and vertical directions is improved. The minor frame angle variation can be obtained by calculating the displacement in different directions. For example, in the 8×8 frame with 2×2 reference windows, the slope of the minimum moving angle detectable in the present invention is $^{0.5}/_{6}$, i.e., about 4.8 degrees.

In addition, the present invention also includes calculating the variation of acceleration. When the acceleration is a stable and reasonable value, the next displacement can be predicted. When the image movement speed is higher than the reasonably detectable displacement, the detection errors will result in drastic variation of the acceleration, and the acceleration value cannot be stable. Then, the previously predicted moving vector is used as the present movement, and the detected result will be used as the moving vector after the acceleration is stable.

The present invention also provides an apparatus for detecting image movement. In the present embodiment, the apparatus can be an optical mouse. The apparatus comprises an optical-sensing unit, an auxiliary calculating unit, a micro-processing unit, an analog/digital conversion unit, and a signal filter unit. The optical-sensing unit is coupled to the analog/digital conversion unit. The analog/digital conversion unit is coupled to the signal filter unit. The optical-sensing unit accesses the frame and outputs a digital signal through the analog/digital conversion unit. The noise of the digital signal is removed by the signal filter unit, and the digital signal is then transmitted to the micro-processing unit. The micro-processing unit is coupled to the auxiliary calculating unit. The micro-processing unit accesses a reference frame through the optical-sensing unit, and captures a reference window from the reference frame. The micro-processing unit accesses another reference frame. The micro-processing unit searches a sampling window which matches the reference window, and calculates a moving vector based on the reference window in the sampling frame. The micro-processing unit calculates the variation of the acceleration. When the acceleration value is stable and reasonable, the displacement is recoded. When the image movement speed is higher than a detectable displacement, the detection errors will result in drastic variation of the acceleration. As a result, the acceleration cannot be in a reasonable status. The micro-processing unit will then use the previously predicted displacement as the present displacement, and uses the detected result as the moving vector after the acceleration is stable. If the reference window has not reached a margin of the reference frame, a new window in the reference frame is captured to replace the reference window. If the reference window has reached a margin of the reference frame, and the sampling window has reached a margin of the sampling frame, the sampling frame replaces the reference frame as a new reference frame. Then, the reference window is captured in the new reference frame.

Accordingly, when detecting image movement, the present invention does not require additional hardware and can reduce the calculation, while enhancing the capability of detecting the maximum displacement. In addition, the present invention can enhance the capability of detecting the minor displacement to calculate the image movement angle variation. Moreover, when the detected frame displacement is more than the maximum detectable displacement, the moving vector is compensated according to the principle of inertia.

The above and other features of the present invention will be better understood from the following detailed description of the preferred embodiments of the invention that is provided in communication with the accompanying drawings.

DESCRIPTION OF SOME EMBODIMENTS

Figure 2:
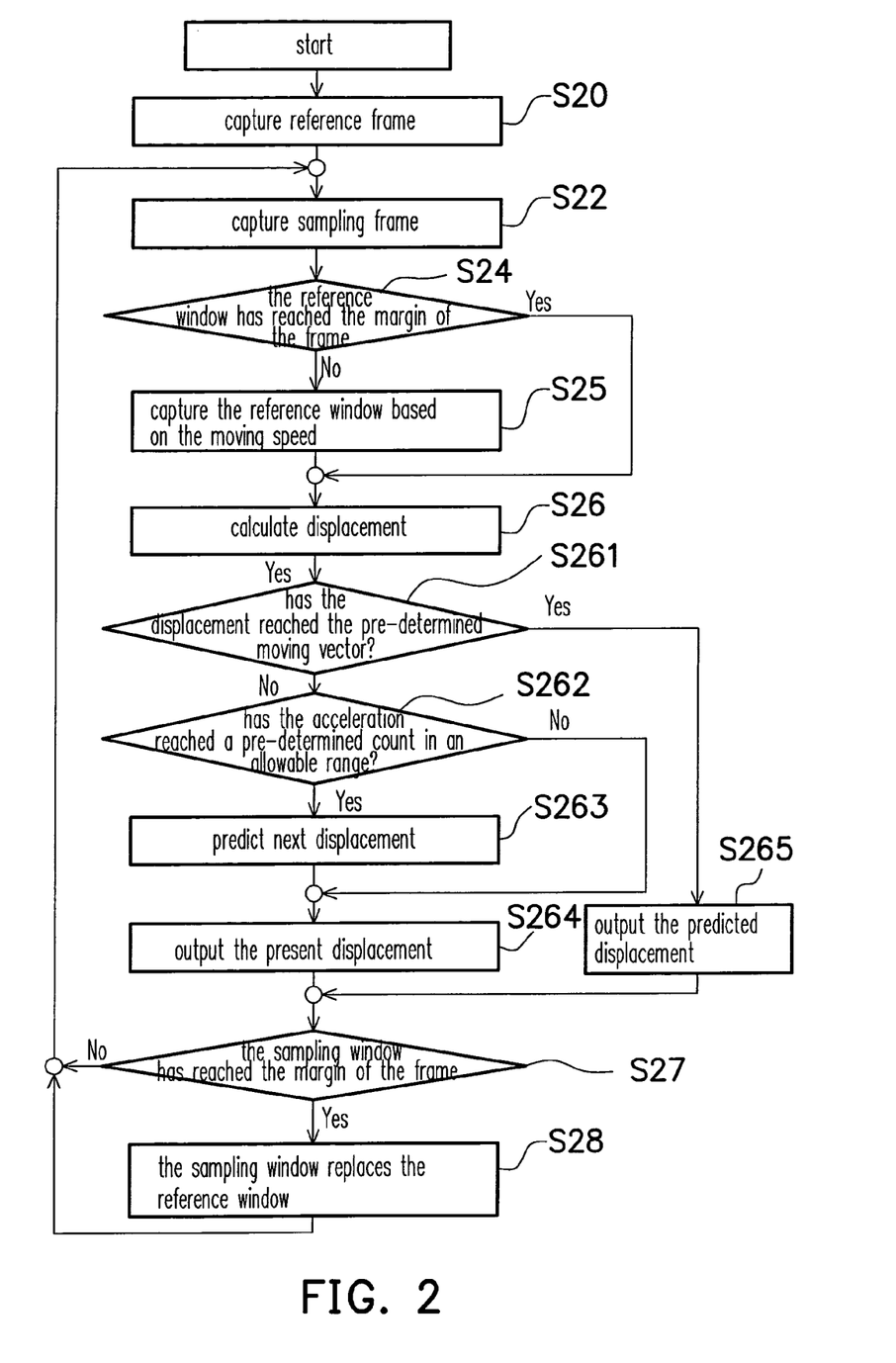
FIG. 2 is a flowchart showing a method of an embodiment of the present invention.
Figure 3A:
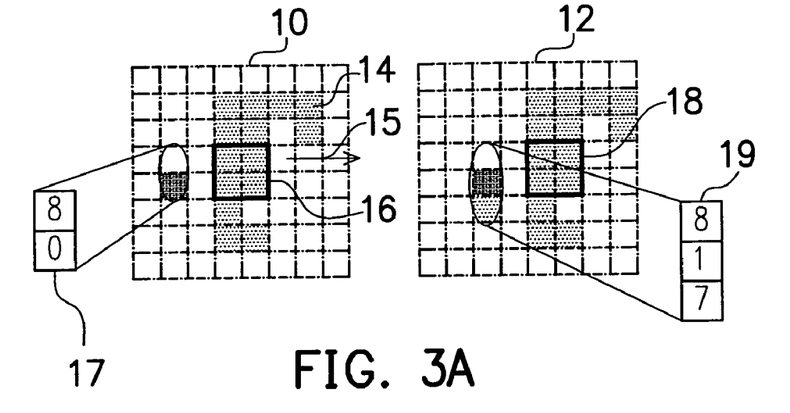
FIGS. 3A-3F are drawings showing steps of detecting image movement according to an embodiment with a 8×8 frame of the present invention, wherein the left column represents reference frames, and the right column represents sampling frames.
Figure 3B:
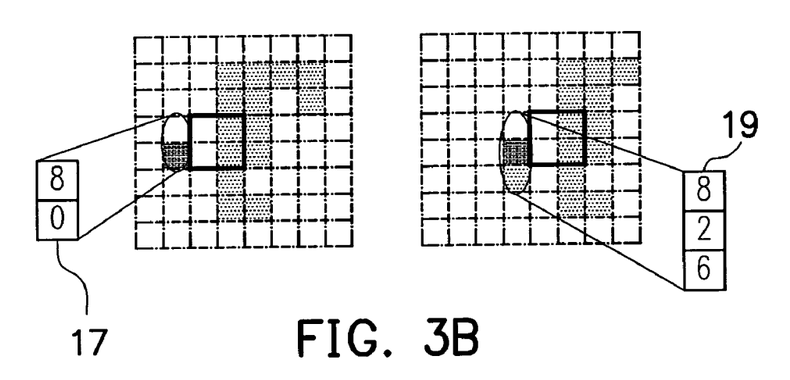
Figure 3C:
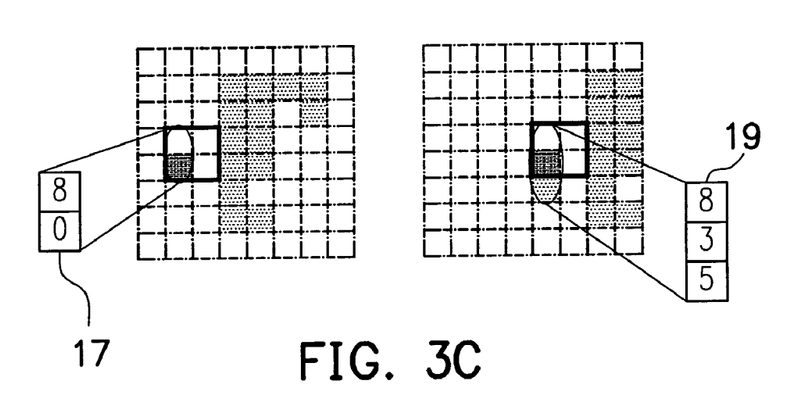

FIG. 2 is a flowchart showing a method of an embodiment of the present invention. FIGS. 3A-3F are drawings showing steps of detecting image movement according to an embodiment with a 8×8 frame of the present invention, wherein the left column represents reference frames, and the right column represents sampling frames. Referring to FIGS. 2, and 3A-3F, the value of the black squares is 0, and the value of the white squares is 8. The present invention can be applied to an apparatus which can detect the image movement, such as an optical mouse. In this embodiment, the mouse moves to the left and then upward. The moving angle is about 7 degrees, or ⅛, and the frame moves to the bottom right. In this embodiment of the present invention, the steps of detecting image movement are described below. In the step S20, a first frame is captured to serve as the reference frame 10. The center of the reference frame 10 is captured as the reference window 16. In the step S22, a second frame is captured as the sampling frame 12. In FIGS. 3A-3F, for the two squares in the window 17 of the reference frame 10, the value of the top square is 8, and the value of the bottom square is 0. When the frame 14 moves to the location 15 in the horizontal and then slightly downward direction, the moving angle is about 7 degrees, or ⅛. That is, when the sampling frame 12 moves right for a square, the frame will move downward for ⅛ square. The difference of gray levels in the window 19 corresponding to the window 17 will be 1. Then a window having the size similar to that of the reference window 16 and whose gray level is most similar to that of the reference window 16 in the sampling frame 12 is sought so as to form the sampling window 18. Referring to FIGS. 3A and 3B, when the frame 14 moves to the location 15 in the horizontal and slightly downward direction, the moving speed and the moving vector are calculated according to the relative locations of the reference frame and the sampling window 18. Referring to FIG. 3C and the step S24 in FIG. 2, it is then determined whether the reference window 16 and the sampling window 18 have reached the margin of the frame. If the reference window 16 has not reached the margin of the frame, the steps S25 and S26 are performed. According to the moving speed and the moving vector, a new window is captured to replace the original reference window 16 as a new reference window 16 in the direction reverse to the moving vector, i.e., in the left direction in FIG. 3B.

A set of variables are used to record the detected displacement and to compensate the moving frame. Referring to the step S261 in FIG. 2, when the moving speed is higher than a predetermined moving vector, the displacement cannot be measured and the acceleration of the image movement becomes unreasonable. Then the predicted displacement is output as the present displacement in the step S265. It is determined whether to reset the counting value of the acceleration in the allowed range so as to determine if the acceleration is in the stable status. After the image movement speed is in the detectable range, it is determined whether the counting value of the acceleration of the image movement in the allowed range reaches a pre-determined number in the step S262. For example, if the detected acceleration is 0 or smaller than 1 pixel/sec$^2$ for more than three times, the acceleration of the image movement is in a stable status. The next displacement is then predicted and the preset displacement is output in the steps S263 and S264. If the detected acceleration is not 0 or smaller than 1 pixel/sec$^2$ for more than three times, only the present displacement is output in the step S264. In other words, the variation of the acceleration is used to determine whether the maximum moving speed is exceeded. If so, the previously predicted displacement is output according to the principle of inertia. If not, the present displacement is output.

Figure 3D:
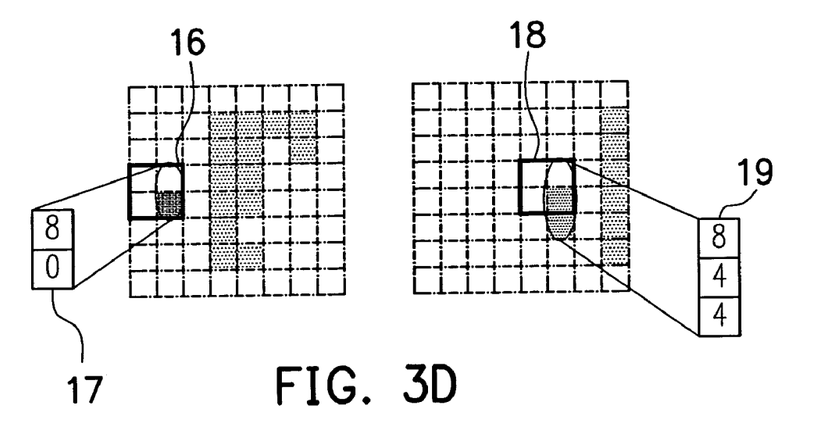
Figure 3E:
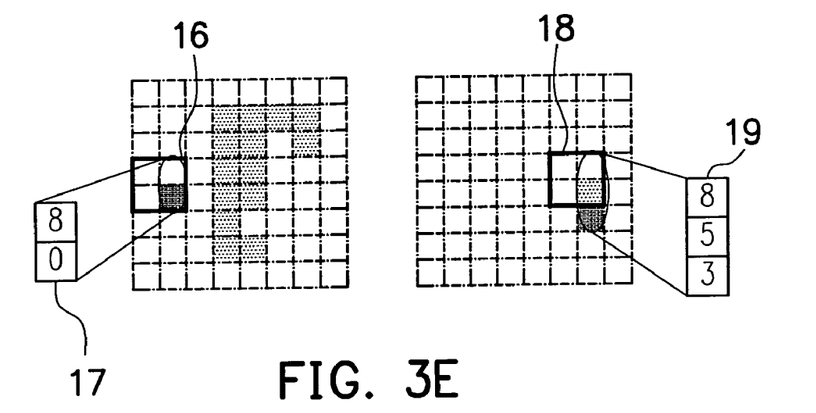

Referring to FIGS. 3D and 3E, the reference window 16 reaches the margin of the frame. Moving right following the frame 14, the sampling window 18 gradually shifts toward the margin of the frame. Assuming the reference window 16 and the sampling window 18 reach the margin of the frame as shown in the step S27 in FIG. 2 and FIG. 3F, the sampling frame in which the frame window 18 reaches the margin of the frame would replace the original frame to serve as a new reference frame as shown in the step S28 in FIG. 2. A reference window 16 is captured from the new frame. Then, the step S22 is repeated.

Figure 3F:
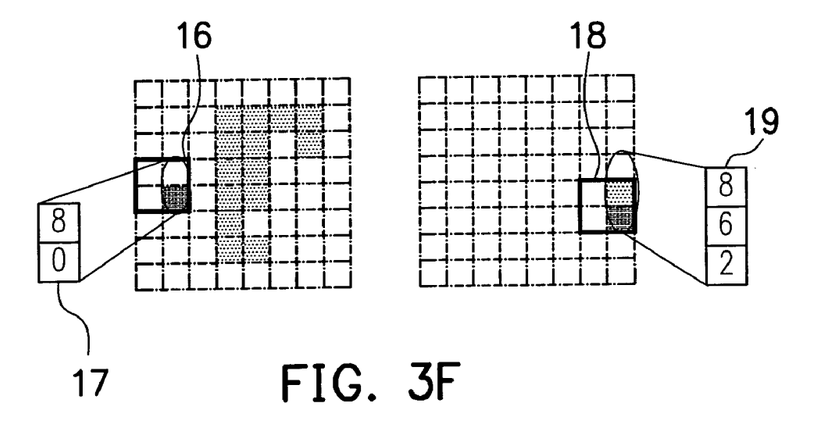
Figure 4:
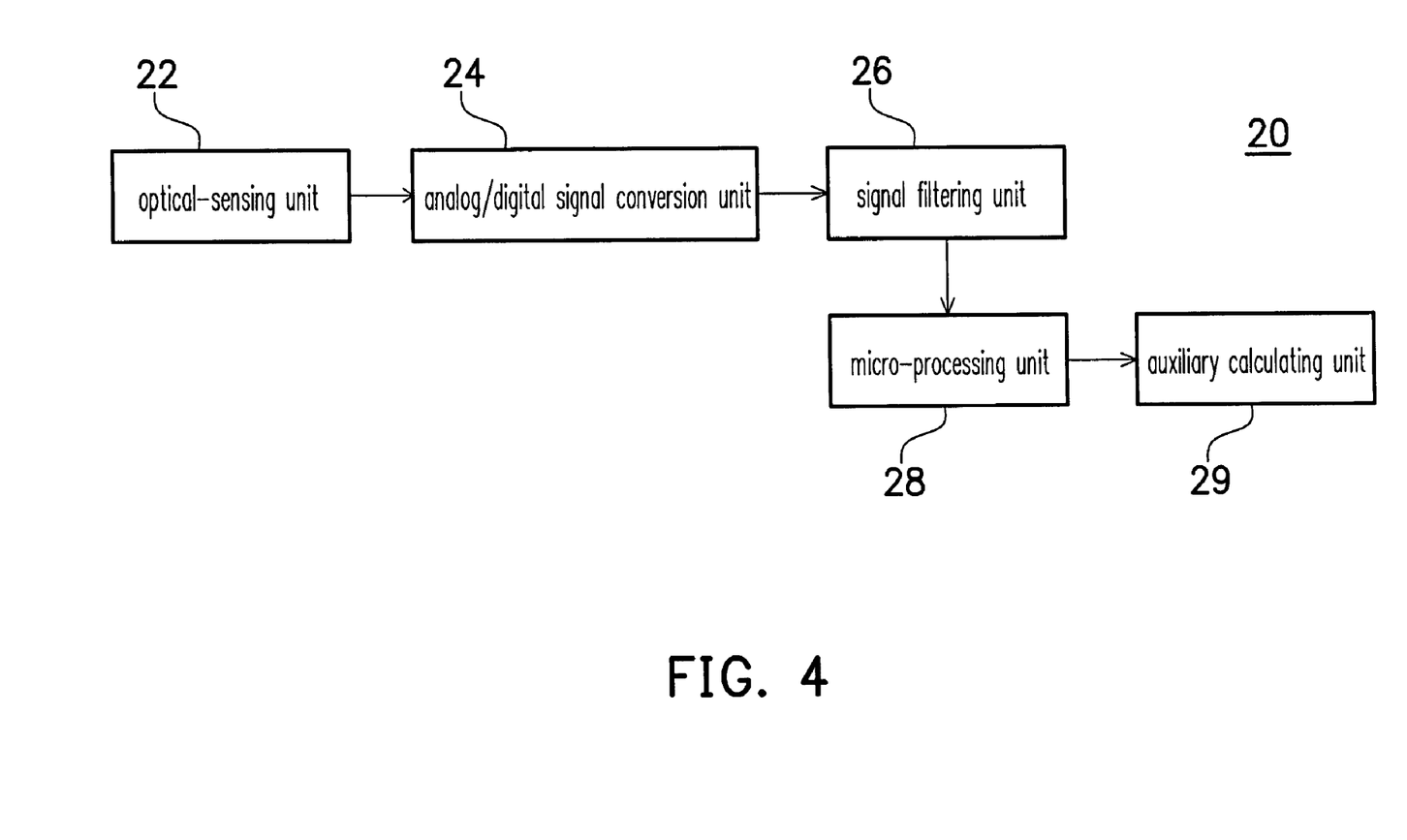
FIG. 4 is a drawing showing a functional block of the apparatus for detecting image movement according to an embodiment of the present invention.

In order to point out the feature of detecting the small angle, the mean absolute difference (MAD) method is used as the method of detecting the moving as shown in FIGS. 3D-3F. The values of the two top squares in the window 19 and the MAD value of the window 17 represent the MAD value in the vertical direction without displacement, i.e., dy=0. The values of the two bottom squares of the window 19 and the MAD value of the window 17 represent the MAD value in the vertical direction with a downward displacement, i.e., dy=−1. In FIG. 3D, the MAD value of dy=0 is 4, and the MAD value of dy=−1 is 8. Because the MAD value of dy=0 is less than that of dy=−1, the vertical direction is selected without displacement. In FIG. 3E, the MAD value of dy=0 is 5, and the MAD value of dy=−1 is 6. Because the MAD value of dy=0 is less than that of dy=−1, the vertical direction is selected without displacement. In FIG. 3F, the MAD value of dy=0 is 6, and the MAD value of dy=−1 is 4. Because the MAD value of dy=0 is larger than that of dy=−1, the vertical direction is selected with a downward displacement. In FIG. 3F, the system has detected the downward displacement. Comparatively, the conventional method automatically renews or resets the reference frame, and thus cannot detect the downward displacement.

In this embodiment, the frame 14 moves to the location 15 in a horizontal and then slightly downward direction. Accordingly, the moving speed and the moving vector can be calculated according to the relative locations of the reference frame and the sampling window 18. By determining whether the reference window 16 and the sampling window 18 have reached the margin of the frame, the present invention can determine whether to replace the original reference frame with the sampling frame, and to use the new reference frame to capture another reference window 16. The present invention, however, is not limited thereto. One of ordinary skill in the art would know that the reference frame is renewed when the reference window and the sampling window have reached the margin of the frame. Accordingly, the present invention allows the frame to move vertically or in any direction to enhance the capability of detecting the minor displacement. By calculating the displacement in any direction, the present invention can calculate the minor angle variation of the image movement.

Referring to FIGS. 3A-3F and 4, the present invention provides an apparatus 20 for detecting image movement. The connection of the internal units, the steps of detecting image movement and relative operations are as follows. The apparatus 20 comprises an optical-sensing unit 22, an auxiliary calculating unit 29, a micro-processing unit 28, an analog/digital signal conversion unit 24, and a signal filter unit 26. The optical-sensing unit 22 is coupled to the analog/digital signal conversion unit 24, which is coupled to the signal filter unit 26. When the optical-sensing unit accesses the frame, the digital signal is output through the analog/digital signal conversion unit 24. The noises of the digital signal are removed by the signal filter unit 26, and the digital signal is transmitted to the micro-processing unit 28.

The steps of detecting image movement and relative operation of the apparatus 20 for detecting image movement in the present invention are described in the following. The micro-processing unit 28 captures the first frame as the reference frame 10, and the second frame as the sampling frame 12 through the optical-sensing unit 22. The micro-processing unit 28 also captures the center of the reference frame 10 as the reference window 16. With the operation of the auxiliary calculating unit 29, the micro-processing unit 28 searches the window having the size similar to the reference window 16 and whose gray level most is similar to that of the reference window 16 to serve as the sampling window 18. Referring to FIGS. 3A and 3B, when the frame 14 moves to the location 15 in the horizontal and slightly downward direction, or from the center to the right in FIG. 3A, s the moving speed and the moving vector are calculated based on the reference frame and the sampling window 18. As stated in the last embodiment, the micro-processing unit 28 compensates the moving frame. The variation of the acceleration is used to determine whether the maximum moving speed is exceeded. If so, the predicted displacement is output according to the principle of inertia. If not, the detected displacement is output. Referring to FIG. 3C, the micro-processing unit 28 determines whether the reference window 16 and the sampling window 18 have reached the margin of the frame. If the reference window 16 has not reached the margin of the frame, in the same reference frame, a new window 16 is captured to replace the original reference window 16, as a new reference window 16, in the direction reverse to the moving frame, or from the center to the left in FIG. 3B. Referring to FIGS. 3D and 3E, the reference window 16 has reached the margin of the frame. Moving right following the frame 14, the sampling window 18 gradually shifts to the margin of the frame. If the reference window 16 and the sampling window 18 have reached the margin of the frame in FIG. 3F, the micro-processing unit 28 replaces the original reference frame with the sampling frame in which the sampling window 18 has reached the margin of the frame. The micro-processing unit 28 then captures a reference window 16 from the new reference frame.

Figure 5A:
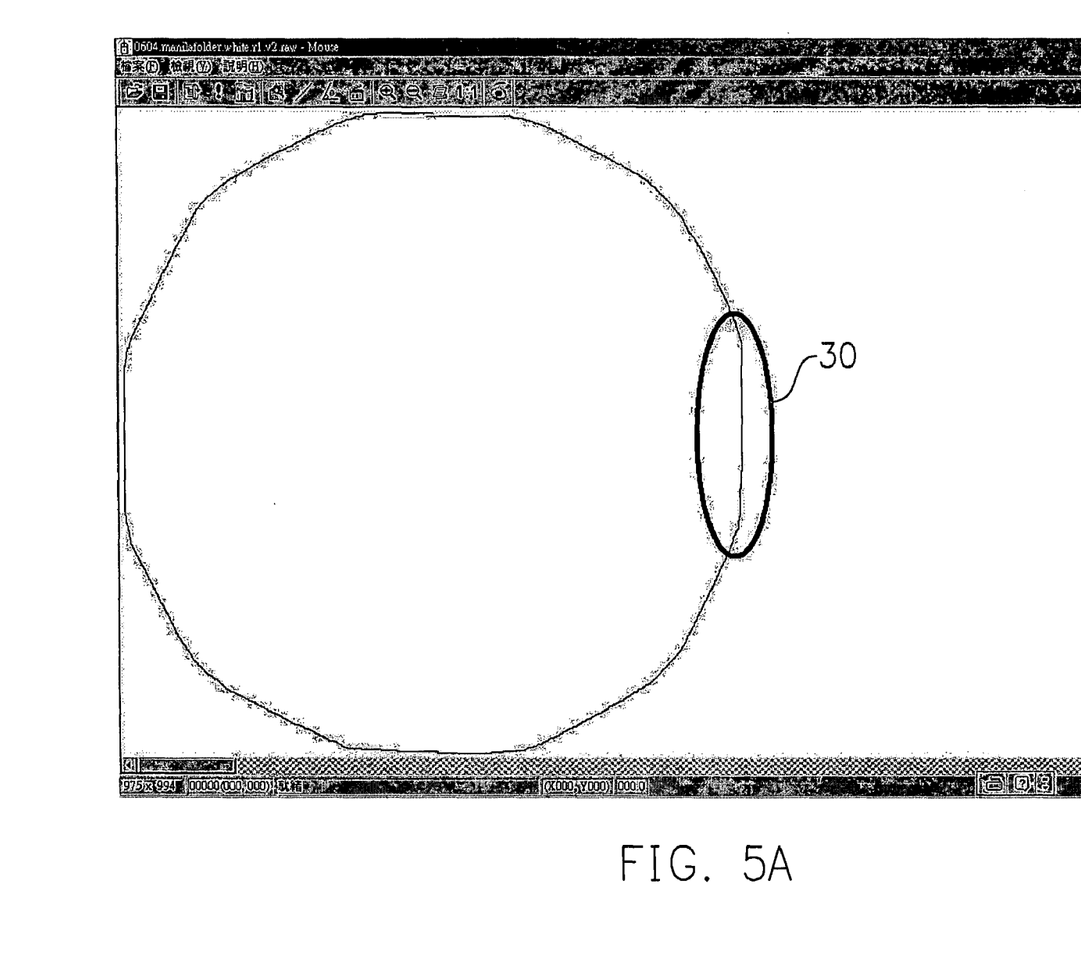
FIG. 5A is a drawing showing a circular track formed by a conventional apparatus for detecting an image movement.
Figure 5B:
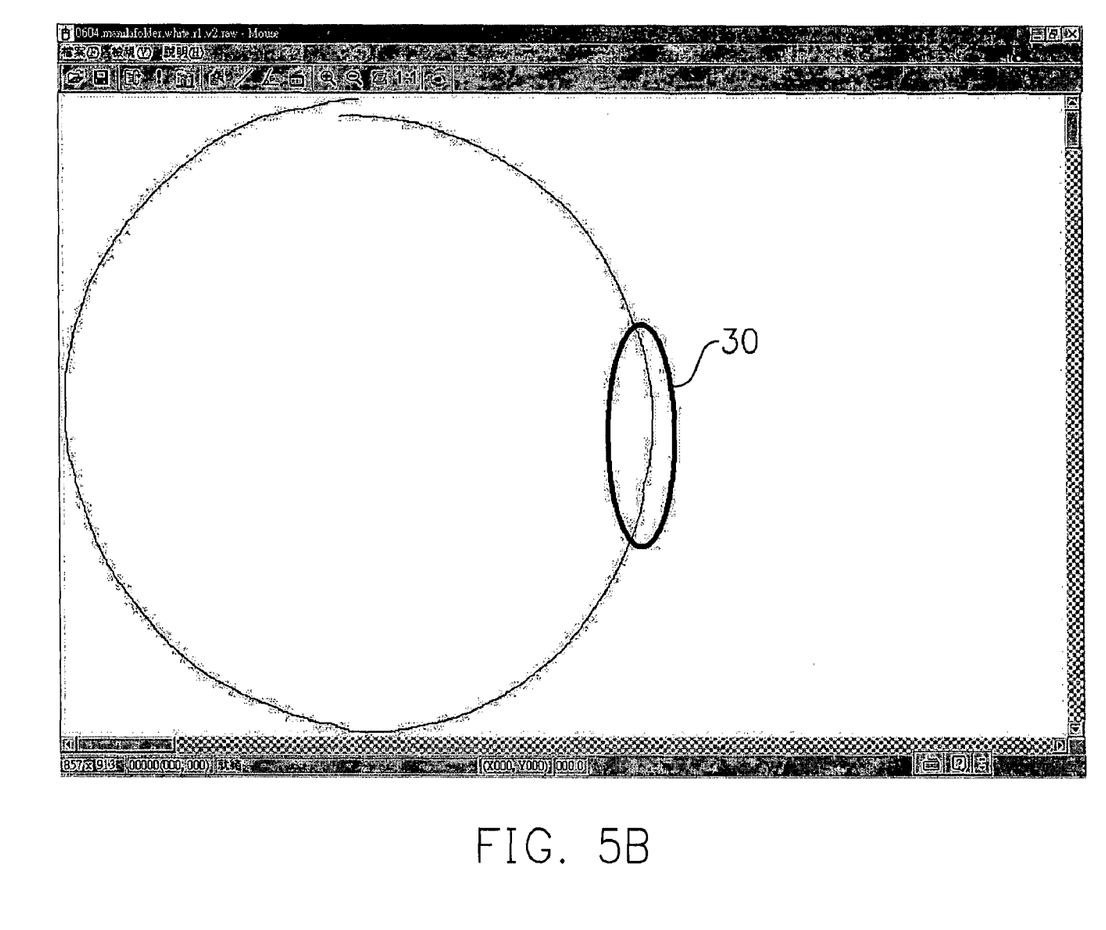
FIG. 5B is a drawing showing a circular track formed by an apparatus for detecting image movement according to an embodiment of the present invention.

FIG. 5A is a drawing showing a circular track formed by a conventional apparatus for detecting image movement. FIG. 5B is a drawing showing a circular track formed by an apparatus for detecting image movement according to an embodiment of the present invention. The apparatus 20 for detecting image movement of the present invention can be, for example, an optical mouse. Referring to FIGS. 5A and 5B, by comparing the sections 30 of FIGS. 5A and 5B, the circular track formed by the apparatus 20 of the present invention is smoother.

In the conventional technology, the reference frame is renewed when the sampling window 18 reaches the margin of the frame. That is, when the sampling frame reaches the margin in the X(Y) direction is detected, movement of the sampling frame in the Y(X) direction has not yet been detected. That means the conventional method cannot detect the minor angle displacement. As a result, the smoothness of the circular track is not desirable. If the size of the array of the apparatus for detecting image movement is N, and the size of the reference window 16 is M, the maximum displacement of the apparatus for detecting image movement is ±(N−M)/2, and the minimum detectable moving angle is $\tan^{-1}(1/(N-M))$. In the embodiment with the 8×8 frame and 16 2×2 reference windows, the minimum detectable moving angle is $\tan^{-1}(1/(N-M))=\tan^{-1}(1/(8-2))$. It has a slope of about ⅙, or 9.5 degrees. Therefore, the conventional method cannot detect the moving which has a slope smaller than 9.5 degrees. The moving angles of 0±9.5, 90±9.5, 180±9.5, and 270±9.5 detected in the conventional method would become the angles 0, 90, 180, and 270, respectively.

In the present invention, before the reference window 18 reaches the margin of the frame, in the same reference frame, the different reference window 16 are dynamically captured in the direction reverse to the direction of the image movement so as to enhance the capability of detecting horizontal maximum displacement. In addition, the present invention does not renew the reference frame until the reference window 16 and the sampling window 18 have reached the margin of the frame. Accordingly, the present invention also enhances the capability of detecting minor displacement in the vertical direction. With the horizontal and vertical displacement, the minor angle variations of the image movement can be calculated. In one embodiment with the 8×8 frame and 2×2 reference windows 16 as example, the minimum detectable moving angle in the present invention is $\tan^{-1}(0.5/(N-M))$, which represents a slope of about (0.5/6) or 4.8 degrees. Compared with the conventional technology, the sensitivity of detecting angle variation of the image movement in the present invention is double.

As described above, the present invention is not limited to these embodiments. Within the scope of the present invention, one of ordinary skill in the art would know that the reference frame is renewed when the reference window and the sampling window have reached the margin of the frame. When the frame moves vertically or in any direction, the present invention can detect the minor displacement in any direction. With the displacement in any direction, the minor angle variation of the image movement can be calculated.

Accordingly, the present invention has at least the following advantages:

1. Besides keeping the hardware structure simple and reducing the calculation, the present invention also enhances the capability of detecting maximum displacement in any direction.

2. By enhancing the capability of detecting minor displacement, the present invention doubles the sensitivity of detecting angle variation of the image movement from the conventional technology.

3. When the moving speed exceeds the detectable range, the present invention compensates the image movement of unreasonable acceleration with the predicted moving vector, to obtain better stability according to the principle of inertia.

Although the present invention has been described in terms of exemplary embodiments, it is not limited thereto. Rather, the appended claims should be constructed broadly to include other variants and embodiments of the invention which may be made by those skilled in the field of this art without departing from the scope and range of equivalents of the invention.

What is claimed is:

1. A method of detecting image movement, comprising the following steps:
    (A) accessing a reference frame, and capturing a reference window from the reference frame;
    (B) accessing a sampling frame, and searching a sampling window matching the reference window from the sampling frame;
    (C) when the reference window moves and has not reached a margin of the reference frame, and the sampling window stops moving in the sample frame and has not reached a margin of the sampling frame, capturing a new window from the reference frame to replace the reference window;
    (D) calculating a moving vector based on relative locations of the reference window and the sampling window;
    (E) when the sampling window has reached the margin of the sampling frame, replacing the reference frame with the sampling frame, and capturing the reference window from the reference frame; and
    (F) repeating the step (B).

2. The method of detecting image movement of claim 1, wherein in step (C), the new window is captured in the reference frame according to the moving vector or a relative speed corresponding to the moving vector.

3. The method of detecting image movement of claim 1, wherein in step (C), the new window is captured in a direction reverse to a moving direction of the sampling window.

4. The method of detecting image movement of claim 1, wherein in step (B), the sampling window is searched by looking for a window having a size similar to the reference window and whose gray level is most similar to that of the reference window in the reference frame.

5. The method of detecting image movement of claim 1, further comprising a method of compensating the image movement between the steps (D) and (E), the method of compensating the image movement comprising the following steps:
   (a) determining whether a pre-determined moving vector is exceeded according to an acceleration;
   (b) outputting a predicted moving vector, when the pre-determined moving vector is exceeded; and
   (c) when the pre-determined moving vector is not exceeded, obtaining a counting value of the acceleration by counting a number of times the acceleration is in an allowable range, and determining whether the counting value reaches a pre-determined number, and when the counting value reaches the pre-determined number, predicting a next moving vector and outputting this displacement; otherwise, only outputting the displacement.

6. The method of detecting image movement of claim 5, wherein the pre-determined number is three, and the allowable range is less than 1 pixel/sec$^2$.

7. An apparatus for detecting image movement, comprising:
   an optical-sensing unit to access a frame;
   an auxiliary-calculating unit to calculate and search a matching frame; and
   a micro-processing unit coupled to the auxiliary-calculating unit, the micro-processing unit accessing a reference frame through the optical-sensing unit, and capturing a reference window in the reference frame, the micro-processing unit also accessing a sampling frame, the micro-processing unit searching a sampling window matching the reference window from the sampling frame, and calculating a moving vector based on relative locations of the reference window and the sampling window, and when the reference window moves and has not reached a margin of the reference frame, and the sampling window stops moving in the sample frame and has not reached a margin of the sampling frame, a new window being captured from the reference frame to replace the reference window; otherwise, the reference frame being replaced with the sampling frame, and the reference window being captured in the reference frame.

8. The apparatus for detecting image movement of claim 7, wherein the apparatus comprises at least one analog/digital signal conversion unit and a signal filter unit, wherein the optical-sensing unit is coupled to the analog/digital signal conversion unit, and the analog/digital signal conversion unit is coupled to the signal filter unit.

9. The apparatus for detecting image movement of claim 7, wherein the new window is captured from the reference frame according to the moving vector or a relative speed corresponding to the moving vector.

10. The apparatus for detecting image movement of claim 7, wherein the new window is captured in a direction reverse to a moving direction of the sampling window.

11. The apparatus for detecting image movement of claim 7, wherein the sampling window is searched by looking for a window having a size similar to the reference window and whose gray level is most similar to that of the reference window in the reference frame.

12. The apparatus for detecting image movement of claim 7, further comprising compensating the image movement after the micro-processing unit calculates the moving vector, the step of compensating the image movement comprising the following steps:
   (a) determining whether a pre-determined moving vector is exceeded according to an acceleration;
   (b) outputting a predicted moving vector, when the pre-determined moving vector is exceeded; and
   (c) when the pre-determined moving vector is not exceeded, obtaining a counting value of the acceleration by counting a number of times the acceleration is in an allowable range, and determining whether the counting value reaches a pre-determined number; when the counting value reaches the pre-determined number, predicting a next moving vector and outputting this displacement; otherwise, only outputting the displacement.

13. The apparatus for detecting image movement of claim 12, wherein the pre-determined number is three, and the allowable range is less than 1 pixel/sec$^2$.

14. The apparatus for detecting image movement of claim 7, wherein the apparatus for detecting image movement is an optical mouse.

* * * * *